UNITED STATES PATENT OFFICE 2,597,398

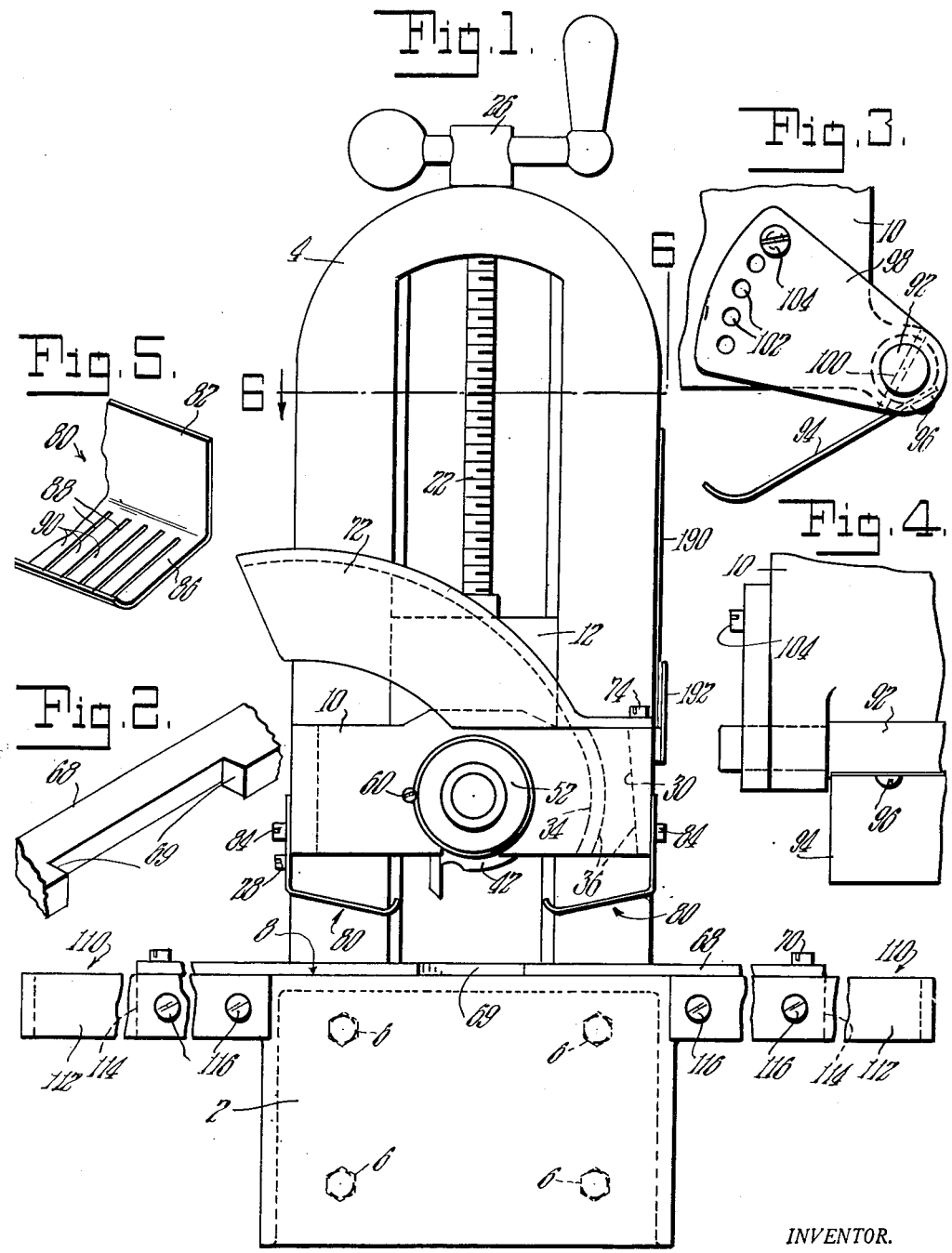

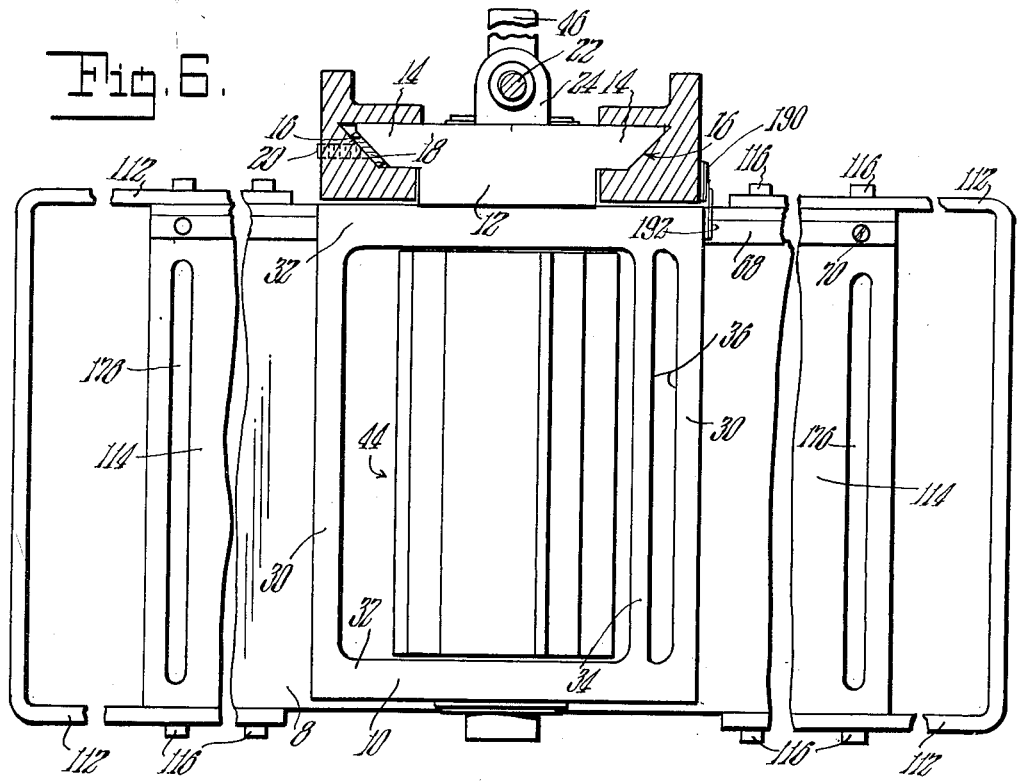
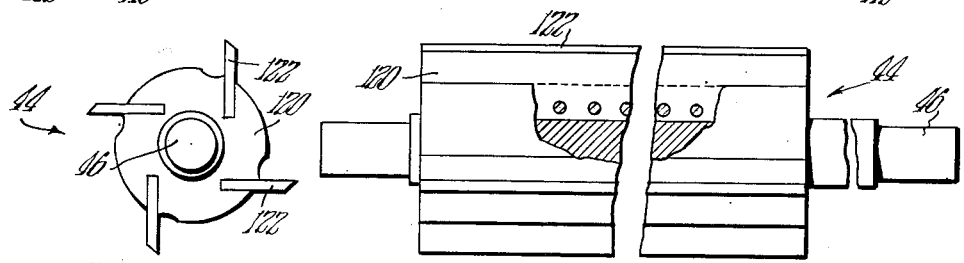

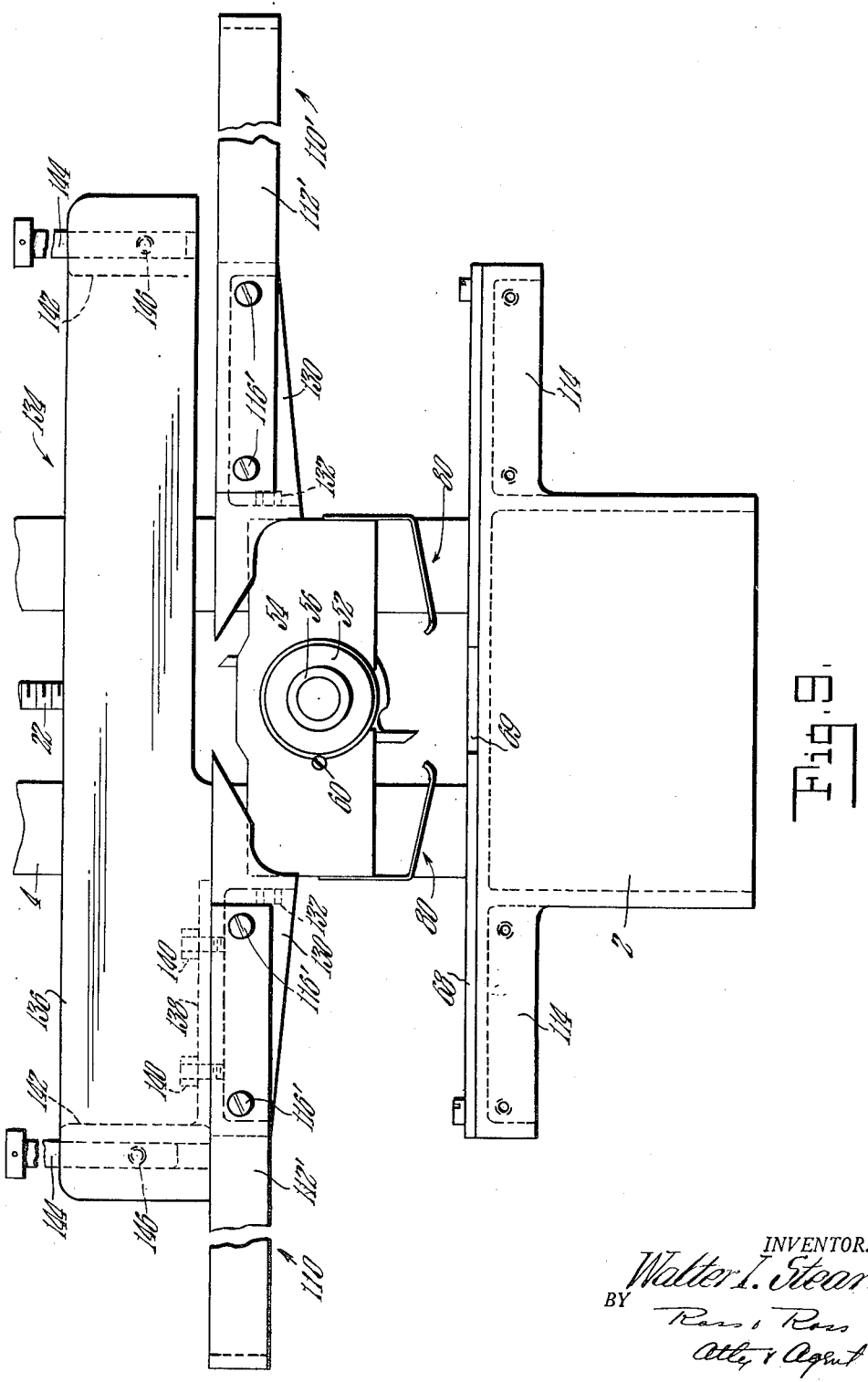

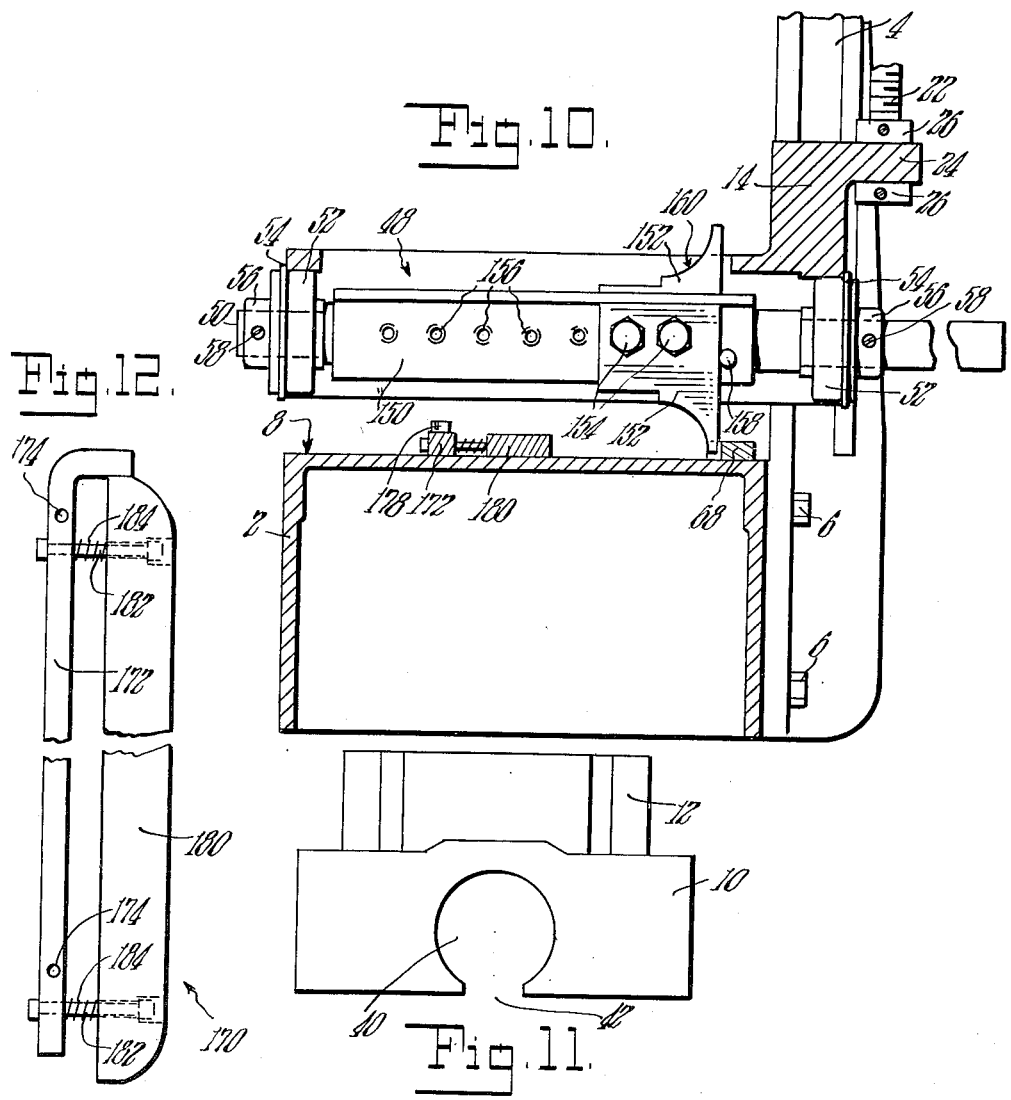

WOODWORKING MACHINE

Walter I. Stearns, Arlington, Vt.

Application October 31, 1950, Serial No. 193,236

5 Claims. (Cl. 144—131)

This invention relates to improvements in wood working machines.

The principal object of the invention is the provision of a wood working machine which is adapted for use as a planer, jointer and/or molder and the same is so constructed and arranged that it may be mounted on a bench or other support so as to be particularly useful in woodworking plants, pattern shops, schools, home workshops and the like.

The machine of the invention is readily and easily adjusted for use as a planer, jointer, moulder, or the like, so as to be capable of performing many and various wood working operations and it is possible to perform dual operations therewith, if the same is desired.

As one special feature of the invention, the work may be inserted into the machine axially of the cutting tool.

According to another feature of the machine, cutter heads may be removed and inserted in the machine with facility. As a special feature of the invention, means is provided to align cutters with a guide whereby successive work pieces may be uniformly formed.

Another important feature of the invention is the provision of a novel means for holding work down on the support during the operation of the cutting head.

A further novel feature of the invention is the provision of a means for transferring the cutting head housing into a support for the work in the operation of the cutter head and a means is provided for extending the work support so as to accommodate work pieces.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a front elevational view of a wood working machine embodying the novel features of the invention;

Fig. 2 is a perspective view showing a portion of the guide of the machine of Fig. 1;

Fig. 3 is an end elevational view of one form of a hold down device of the machine of Fig. 1;

Fig. 4 is a side elevational view of the hold down device shown in Fig. 3;

Fig. 5 is a partial perspective view of the hold down device of the machine of Fig. 1;

Fig. 6 is a sectional plan view on the line 6—6 of Fig. 1 with the chip guard omitted;

Figs. 7 and 8 are end and side elevational views respectively of one of the cutter heads;

Fig. 9 is a front elevational view similar to Fig. 1 showing certain details of construction of the machine;

Fig. 10 is a transverse sectional elevational view through the base and lower portion of the frame of the machine so as to illustrate certain features of construction;

Fig. 11 is a front elevational view of the housing of the machine shown in Fig. 1; and Fig. 12 is a plan view of the straight edge of the machine.

Referring now to drawings more in detail, the invention will be fully described.

A base or table 2 is provided which may be secured to a bench or other support in any desired manner.

A frame 4 is secured as by screws 6 to the rear side of the base 2 and extends upwardly vertically from an upper horizontal work supporting face 8 of the base.

The base 2 and frame 4 thus secured are rigid and immovable relative to one another.

A cutter head housing 10 is provided which is disposed above the base 2 and has an upwardly extending portion 12 at its rear side which has side portions 14 slidable vertically in ways 16 of the frame 4, as shown in Fig. 6.

An elongated gib 18 is provided which is acted upon by screws 20 in the usual manner.

An elongated screw 22 is in threaded engagement with the upper side of the frame 4 and its lower end extends through a lug 24 on the slide 12.

Collars 26 are secured to the screw 22, as best shown in Fig. 10. A manually engageable handle 26' is fixed to the upper end of the screw 22.

By turning the screw 22 in one direction or the other, the housing is raised or lowered so as to position the cutter head relative to the work.

A stop screw 28 is in threaded engagement with the frame and limits the lower position of the housing. This is arranged so as to prevent the rotating cutter from engaging the upper surface of the base. This stop screw may be removed, however, so as to allow the housing to be moved downwardly from its normal lowermost position wherever and whenever desirable.

By means of the screw 22, the housing and the cutter carried thereby may be adjusted through small increments and the cutter may be fed to the work accurately.

The housing 10, see Figs. 1 and 6, is preferably frame like in plan. There are longitudinal and transverse side and end members 30 and 32 respectively and a longitudinal member 34 spaced from the right-hand member 30 providing a slot 36 therebetween.

The transverse members of the housing are provided with circular openings such as 40, as shown in Fig. 11 and with upwardly extending slots 42 leading thereinto.

A cutter head 44 for planing is shown in Figs. 7 and 8. The head has a shaft 46. This head will be more fully described hereinafter. A moulding head 48 having a shaft 50 is shown in Fig. 10 and will be more particularly referred to as the description proceeds.

Antifriction bearings 52 are provided which fit in the openings 40 of the housing. These bearings carry a flange 54 for abutting outer sides of the housing. Collars 56 for opposite ends of the cutter shafts are secured by set screws 58. Screws such as 60 in threaded engagement with the housing, see Fig. 1, may be provided for bearing on the flange 54 and holding the antifriction bearings against rotation.

To remove a cutter head from the housing, the collars 56 are drawn outwardly from the antifriction bearings so that said bearings may be moved axially from the openings 40. Then the cutter head may be lowered by passing the cutter head shaft through the slots 42.

In assembling a cutter head in the housing, the shaft is passed upwardly through the slots 40, the bearings are moved axially into the openings, and the collars are moved against the bearings and are secured in place on the shaft.

An elongated straight edge on the guide 68 is secured as by screws 70 to the upper side of the base against which work may be held as it is passed forwardly between the planer head and the base.

The rear end of the cutter head shaft extends rearwardly from the machine and may be connected as by pulley and belt to a source of power, such as a motor, power shaft, or the like.

The cutter head is rotated counterclockwise as in Fig. 1 and the work is passed from right to left on the base and against the guide 68.

A guard 72 is provided which is channel shape in cross section and is removably secured to the upper side of the housing by screws such as 74.

In rotation of the cutter head counterclockwise, chips are thrown upwardly, and counterclockwise, by wall 34 and guard 72 outwardly to the left. The guard not only affords protection to the operator from the swiftly rotating cutter head but serves to direct chips away from the machine.

The housing may be lowered for feeding the cutter head downwardly for successive passes of the work.

Hold-downs 80 are provided. These may be in the form of resilient metal members having upper portions 82 secured to opposite sides of the housing by screws 84. Inwardly extending portions 86 of the hold-downs are preferably provided with spaced slots or slits 88 thereby providing a plurality of flexible portions 90 which are relatively yieldable. The hold down is such as to bear efficiently on work which may have an uneven surface.

Another form of hold down is shown in Figs. 3 and 4. A shaft 92 is turnable in bearings such as 94 at opposite ends of the housing. A flexible plate 94, slotted similarly to the hold down 80, is secured to the shaft 92 by screws 96.

A lever 98 secured to shaft 92 at its forward end by a pin 100 has a plurality of holes 102 therein. A screw 104 is insertable through one of the openings 102 and is engageable with a tapped hole in the housing. The angularity of the lever and the member 94 may be adjusted to provide the desired tension of the hold down on the work.

Extensions to lengthen the work support so as to accommodate long work pieces are provided and are represented by 110, see Figs. 1 and 6. These extensions 110 are of U-shape and have side portions 112 secured to outer sides of arms 114 extending outwardly from right and left sides of the base by screws 116.

The guide 68, as shown in Fig. 2, is provided with a recess 69 for clearance of the cutter head parts.

The cutter head 44 includes an elongated body 120 having cutter blades 122 projecting therefrom with shaft 46 extending through the body, see Figs. 7 and 8.

Preferably the body will be cast with the blades and shaft cast therein. The body will be cast from a metal having such characteristics as will suitably bond with the blades and shaft and may be of a ferrous or non-ferrous material, all as may be desired. To obtain the desired results, the blades 122 will be provided with a series of apertures which may be in the form of holes, as shown in Fig. 8. Otherwise there may be a plurality of slots, severations, or the like, so as to bring about the integral cutter head structure.

The work to be planed is passed along the supporting surface of the base below the housing and, as will be observed, the work may be inserted laterally between the base and housing and may, as it is operated upon, extend forwardly of the base and housing.

For jointer operations, side tables 130 for supporting work are secured by bolts 132 to opposite sides of the housing, see Fig. 9. When desired, extensions 110' for the tables having side portions 112' may be secured to the tables 130 by screws 116'.

A fence 134 includes a rear elongated vertically disposed plate 136 having a rear flange 138 secured to a side table 130 by bolts 140. Hubs 142 on the rear side at the ends of the plate 136 have extension rods 144 slidable up and down therein. Set screws 146 in threaded engagement with the hubs secure the rods in adjusted positions.

Work may traverse the table 130 for operation of the cutter head to obtain the desired forming of the work and, if desired work may be passed across the base for planing.

Although not shown, there may be a guard provided for purposes of safety and for directing chips away from the work.

For molding operations, the cutter head 48 shown in Fig. 10 is employed. This head has an elongated body 150 to which are secured moulding cutters 152 which take various forms.

The cutters will preferably be secured to the head by bolts 154 in engagement with tapped holes 156 in the head.

A member 190 carrying indicia is fixed to frame 4 and a pointer 192 is fixed on the housing 10. The pointer and member 190 may be arranged to indicate the thickness of work.

A guide pin 158 is provided on the body. The guide pin is located on the head so as to have a predetermined relationship with the guide 68 on the base. Cutters of various shapes may be formed so that, when secured to the body and against the pin, the contour of their working edge will bear a predetermined relation to the guide 68. In this way, the cut on successive work pieces will be uniform. With the quarter-round shape shown, the cut will coincide with the edge of the work against the guide on successive pieces of work.

A straight edge or guide 170 is provided for use in connection with moulding operations. This guide is shown in Fig. 12 and extends across the base.

An elongated strap 172 is provided with openings 174 for bolts 178 which extend through elongated slots 176 in the bed as shown in Fig. 6. An elongated straight edge 180 is movable on bolts 182 and is spring pressed by springs 184 away from the member 172.

The straight edge may be secured to the bed so that, in moulding operations, the work is passed on the base between the straight edge and guide thereby to position the work so as to obtain accuracy in the moulding cut.

It will be observed that work may be inserted laterally between the cutter and surface of the base and may extend laterally outwardly of the base while cutter heads for various purposes may be readily and easily removed from or inserted in the housing.

The housing is readily and easily adjusted.

The machine is capable of numerous and various wood working operations and may be quickly arranged for the performance of the operation desired.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A wood working machine comprising in combination, a base having an upper horizontal work supporting surface and a rear frame immovably secured to the rear side of said base and extending vertically upwardly therefrom and provided with a vertically disposed guideway, a housing having a rear end slidable up and down in said frame extending forwardly therefrom over said base with a forward end unsecured to said base, a cutter head and mounting means for supporting the same in said housing for rotation on a horizontal axis, screw means operatively connecting said frame and housing whereby the latter may be adjusted vertically in said frame, hold down means carried by said housing for bearing on the upper side of work on said supporting surface, and chip receiving means carried by said housing, and work supporting extensions secured to opposite sides of said base and extending outwardly therefrom.

2. In a wood working machine, a housing having spaced opposite end walls provided with aligned openings and slots for receiving shaft ends extending upwardly in said end walls into said openings, a cutter head having shaft ends at opposite ends thereof insertable upwardly into said openings, antifriction bearings in which said shaft ends are rotatable and being slidable axially on said shaft ends whereby with said shaft ends in said openings said bearings may be inserted into said openings and means on said shaft ends holding said bearings against movements outwardly axially of said openings.

3. The combination with the base and vertically extending frame fixed thereto of a wood working machine of means for removably carrying a rotatable cutter head and moving the same towards and away from said base comprising, a housing overlying said base slidably adjustable vertically relative to said base and having aligned bearing openings in opposite ends thereof and slots open at lower ends extending upwardly into said openings, a cutter head having shaft ends at opposite ends thereof insertable upwardly through said slots into said openings, anti-friction bearings slidable axially on said shaft ends whereby with said shaft ends in said openings said bearings are movable towards one another and insertable in said openings, and means on said shaft ends outside said bearings for securing to said shaft ends to hold said bearings in said openings and against outward movements.

4. The combination with the base and vertically extending frame fixed thereto of a wood working machine of means for removably carrying a rotatable cutter head and moving the same towards and away from said base comprising, a housing overlying said base having a longitudinal central opening extending upwardly providing front and rear and side wall portions, said rear wall portion being adjustable vertically in said frame for up and down movements of the housing relative to said base, said front and rear wall portions of the housing provided with horizontally aligned bearing receiving openings and slots extending through lower sides thereof upwardly vertically into said openings, a cutter head receivable in the central opening of the housing having shaft ends at opposite ends thereof for insertion upwardly through the slots of the housing into said openings, anti-friction bearings slidable axially on said shaft ends inwardly into said openings when the shaft ends are disposed therein, and means slidable on said shaft ends adapted to be secured thereto adjacent outer sides of said front and rear wall portions and said bearings for holding said bearings in said openings.

5. The combination with the base and vertically extending frame fixed thereto of a wood working machine of means for removably carrying a rotatable cutter head and moving the same towards and away from said base comprising, a housing overlying said base having a longitudinal central opening extending upwardly providing front and rear and side wall portions, said rear wall portion being adjustable vertically in said frame for up and down movements of the housing relative to said base, said front and rear wall portions of the housing provided with horizontally aligned bearing receiving openings and slots extending through lower sides thereof upwardly vertically into said openings, a cutter head receivable in the central opening of the housing having shaft ends at opposite ends thereof for insertion upwardly through the slots of the housing into said openings, anti-friction bearings slidable axially on said shaft ends inwardly into said openings when the shaft ends are disposed therein, and means slidable on said shaft ends adapted to be secured thereto adjacent outer sides of said front and rear wall portions and said bearings for holding said bearings in said openings, a guard member secured at the upper side of said housing over one side wall portion thereof extending upwardly therefrom and across and above the central opening of the housing.

WALTER I. STEARNS.

REFERENCES CITED

The following references are of record in the file of this patent:

UNITED STATES PATENTS

| Number | Name | Date |
|---|---|---|
| 170,396 | Rees | Nov. 23, 1875 |
| 214,062 | Streit | Apr. 8, 1879 |
| 359,071 | Graham | Mar. 8, 1887 |
| 463,577 | Doane | Nov. 17, 1891 |
| 487,406 | Friedrichs | Dec. 6, 1892 |
| 686,428 | Thomas | Nov. 12, 1901 |
| 1,021,202 | Marsh | Mar. 26, 1912 |
| 1,022,176 | Boothby | Apr. 2, 1912 |
| 1,690,146 | Vivarttas et al. | Nov. 6, 1928 |
| 1,802,096 | Tautz | Apr. 21, 1931 |
| 2,104,158 | Hedgpeth | Jan. 4, 1938 |
| 2,349,162 | Gaskell et al. | May 16, 1944 |